(12) United States Patent
Vijayan

(10) Patent No.: US 11,449,825 B2
(45) Date of Patent: Sep. 20, 2022

(54) SYSTEMS AND METHODS FOR AUTOMATIC AND INTELLIGENT PARCEL RETRIEVAL

(71) Applicant: Coupang Corp., Seoul (KR)

(72) Inventor: Remesh Vijayan, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/152,925

(22) Filed: Jan. 20, 2021

(65) Prior Publication Data

US 2022/0230136 A1    Jul. 21, 2022

(51) Int. Cl.
*G06Q 10/08* (2012.01)
*G06F 16/25* (2019.01)

(52) U.S. Cl.
CPC ....... *G06Q 10/0837* (2013.01); *G06F 16/252* (2019.01); *G06Q 10/0833* (2013.01); *G06Q 10/0875* (2013.01)

(58) Field of Classification Search
CPC ............. G06Q 10/087; G06Q 30/0641; G06Q 10/08355; G06Q 10/083; G06Q 20/12; G06Q 10/0833
See application file for complete search history.

(56) References Cited

U.S. PATENT DOCUMENTS

| | | | |
|---|---|---|---|
| 7,664,651 B1 * | 2/2010 | Bennett | G06Q 10/025 705/336 |
| 7,941,347 B2 * | 5/2011 | Boonie | G06Q 30/0607 705/26.25 |
| 8,762,290 B2 * | 6/2014 | Williams | G06Q 10/10 705/334 |
| 10,878,369 B2 | 12/2020 | Gillen et al. | |
| 2003/0135420 A1 * | 7/2003 | Culling | G06Q 30/0617 705/26.43 |

(Continued)

FOREIGN PATENT DOCUMENTS

KR    10-2007-0098141 A    10/2007
KR    10-2013-0127585 A    11/2013

OTHER PUBLICATIONS

Postal Service 39 CFR Part 111, USPS Package Intercept—New Product Offerings (Mar. 28, 2012) ("USPS") (Year: 2012).*

(Continued)

*Primary Examiner* — Peter Ludwig
(74) *Attorney, Agent, or Firm* — Finnegan, Henderson, Farabow, Garrett & Dunner LLP

(57) ABSTRACT

A computer-implemented systems and methods for automatic and intelligent parcel retrieval are disclosed. The computer-implemented system comprises a database, a memory storing instructions, and at least one processor configured to receive an order number, to receive from a seller a waybill number associated with the order number and a carrier delivering a package, to generate a unique identifier that may include the order number and the way bill number, to detect a cancellation of the order number, to determine a tracking number in the unique identifier based on the cancellation of the order number, to send a notification to the carrier delivering the package based on the unique identifier, to receive from the carrier a reverse tracking number confirming the cancel shipment of the package, and to send a notification to the seller including the reverse tracking number.

19 Claims, 12 Drawing Sheets

(56) References Cited

U.S. PATENT DOCUMENTS

| | | | |
|---|---|---|---|
| 2006/0282277 A1* | 12/2006 | Ng | G06Q 10/0831 |
| | | | 705/333 |
| 2008/0302866 A1 | 12/2008 | Baugh et al. | |
| 2012/0030049 A1* | 2/2012 | Jacobs | G07F 17/0042 |
| | | | 705/26.1 |
| 2013/0178269 A1* | 7/2013 | Shaw | G07F 17/3244 |
| | | | 463/16 |
| 2016/0171542 A1* | 6/2016 | Fanous | G06Q 30/0256 |
| | | | 705/14.54 |
| 2016/0308897 A1* | 10/2016 | Chapman | H04L 63/1483 |
| 2018/0025320 A1 | 1/2018 | Liu et al. | |
| 2019/0385107 A1* | 12/2019 | Renfroe | G06Q 30/0207 |
| 2020/0265383 A1* | 8/2020 | Zhang | G06Q 10/08355 |
| 2020/0403954 A1* | 12/2020 | Perry | G06Q 50/01 |

OTHER PUBLICATIONS

International Search Report in counterpart International Application No. PCT/IB2021/050954, dated Oct. 15, 2021 (10 pp).

* cited by examiner

US 11,449,825 B2

SYSTEMS AND METHODS FOR AUTOMATIC AND INTELLIGENT PARCEL RETRIEVAL

TECHNICAL FIELD

The present disclosure generally relates to computerized systems and methods for automated parcel retrieval once a customer has cancelled an order. In particular, embodiments of the present disclosure relate to inventive and unconventional systems and methods for automatic and intelligent parcel retrieval without the assistance of sellers.

BACKGROUND

Third-party sellers utilizing fulfillment companies to advertise and sell their products to customers may be faced with the problem of not obtaining notification from fulfillment companies that customers may have cancelled an order related to their product. This lag of time in third-party sellers being notified that customers may have cancelled one of their product sold through the fulfillment companies may create a big problem for third-party sellers attempting to retrieve the product that the third-party sellers may have already shipped to customers. Third-party sellers may find themselves wasting a lot of capital and resources in attempting to contact parcel/mail carriers to retrieve parcels or packages associated with cancelled orders from customers. Third-party sellers may not be efficient in intercepting and collecting packages from parcel/mail carriers because they may not have in place any systems and methods to in the least amount of time and resources contact and retrieve the packages from parcel/mail carriers.

On many occasions, customers may complain to fulfillment companies that they may have received packages from order that they may have cancelled. In addition, customers may not have any way of returning the packages to third-party sellers, or third-party sellers may take a long amount of time to retrieve the packages from customers. Furthermore, some packages may remain with the customer without the third-party sellers retrieving the package from customers. Thus, third-party sellers may request from fulfillment companies some monetary compensation for the cancelled orders when in fact fulfillment companies may have notified third-party sellers that the order may have been cancelled by customers.

The inability of third party sellers from retrieving packages associated with cancelled orders from customers or the inability for fulfillment companies to quickly communicate to third party sellers that customers may have cancelled their orders may affect the goodwill of both fulfillment companies and third-party sellers from the viewpoint of customers, which may result in decreased sales or utilization of fulfillment companies platforms to buy products. Moreover, third party sellers may decide not to utilize the platforms offered from fulfillment companies to sell their products, or fulfillment companies may decide not to advertise products offered by third party sellers because the third party sellers may not have systems and methods designed to quickly retrieve packages from parcel/mail carriers before it arrives at customers. Fulfillment companies may also be reluctant to advertise products from third party sellers because third party sellers may not appropriately be integrated with parcel/mail carriers to facilitate the communication and retrieval of packages that may have been cancelled by customers.

Fulfillment companies may not have any systems and methods to quickly communicate with third party sellers to alert them that packages may have been cancelled other than the systems and methods that they may already have in place to sell products for third party sellers. Furthermore, fulfillment companies may not have any systems and methods that integrate with parcel/mail carriers to retrieve packages associated with cancelled orders from customers. Therefore, fulfillment companies do not provide any systems to communicate with third party sellers and parcel/mail carriers to retrieve packages from parcel/mail carrier networks when customers may have cancelled their orders.

Therefore, there is a need for improved methods and systems for automatic and intelligent parcel retrieval that integrates with parcel/mail carriers to quickly retrieve packages in their mail network, that retrieves packages from parcel/mail carrier networks without sellers being involved in the retrieval process, that integrates an interface for sellers to request the retrieval of packages associated with cancelled orders from customers, and that alerts customers regarding cancelled packages that are scheduled for delivery at their address when customers have cancelled an order from the fulfillment company.

SUMMARY

One aspect of the present disclosure is directed to a computer-implemented system for automatic and intelligent parcel retrieval. The computer-implemented system comprises a database, a memory storing instructions, and at least one processor. The at least one processor may be configured to execute the instructions to receive an order number for an item purchased by a customer, to receive from a seller a waybill number that may be associated with the order number for the item purchased by the customer and a carrier delivering a package for the item purchased by the customer, to generate a unique identifier that may include the order number for the item purchased by the customer and the waybill number from the seller, and to detect a cancellation of the order number associated with the item purchased by the customer. Furthermore, the at least one processor may be configured to execute the instructions to determine a tracking number in the unique identifier that may be associated with the waybill number from the seller and the carrier delivering the package based on the cancellation of the order number, to send a notification to the carrier delivering the package to cancel shipment of the package to the customer based on the unique identifier that may be associated with the cancellation of the order number, to receive from the carrier a reverse tracking number confirming the cancel shipment of the package to the customer, and to send a notification to the seller that may include the reverse tracking number associated with the cancel shipment of the package to the customer and the waybill number of the package.

Another aspect of the present disclosure is directed to a method for automatic and intelligent parcel retrieval. The method may comprise the steps of receiving an order number for an item purchased by a customer, receiving from a seller a waybill number that may be associated with the order number for the item purchased by the customer and a carrier delivering a package for the item purchased by the customer, generating a unique identifier that may include the order number for the item purchased by the customer and the waybill number from the seller, and detecting a cancellation of the order number associated with the item purchased by the customer. Furthermore, the method may comprise determining a tracking number in the unique identifier that may be associated with the waybill number from the seller and the carrier delivering the package based on the cancellation of the order number, sending a notification to the carrier delivering the package to cancel shipment of the package to the customer based on the unique identifier that may be associated with the cancellation of the order number, receiving from the carrier a reverse tracking number confirming the cancel shipment of the package to the customer, and sending a notification to the seller that may include the reverse tracking number associated with the cancel shipment of the package to the customer and the waybill number of the package.

Yet another aspect of the present disclosure is directed to a computer-implemented system for automatic and intelligent parcel retrieval. The computer-implemented system comprises a database, a memory storing instructions, and at least one processor. The at least one processor may be configured to execute the instructions to receive an order number for an item purchased by a customer, to receive from a seller a waybill number that may be associated with the order number for the item purchased by the customer and a carrier delivering a package for the item purchased by the customer, to generate a unique identifier that may include the order number for the item purchased by the customer and the waybill number from the seller, and to detect a cancellation of the order number associated with the item purchased by the customer. Furthermore, the at least one processor may be configured to execute the instructions to determine a tracking number in the unique identifier that may be associated with the waybill number from the seller and the carrier delivering the package based on the cancellation of the order number, to send a notification to a carrier driver delivering the package to cancel shipment of the package to the customer based on the unique identifier that may be associated with the cancellation of the order number, to receive from the carrier driver delivering the package an acknowledgement receipt to cancel shipment of the package to the customer, to receive from the carrier a reverse tracking number confirming the cancel shipment of the package to the customer based on the acknowledgement receipt from the carrier driver, and to send a notification to the seller that may include the reverse tracking number associated with the cancel shipment of the package to the customer and the waybill number of the package.

Other systems, methods, and computer-readable media are also discussed herein.

DETAILED DESCRIPTION

Figure 1A:
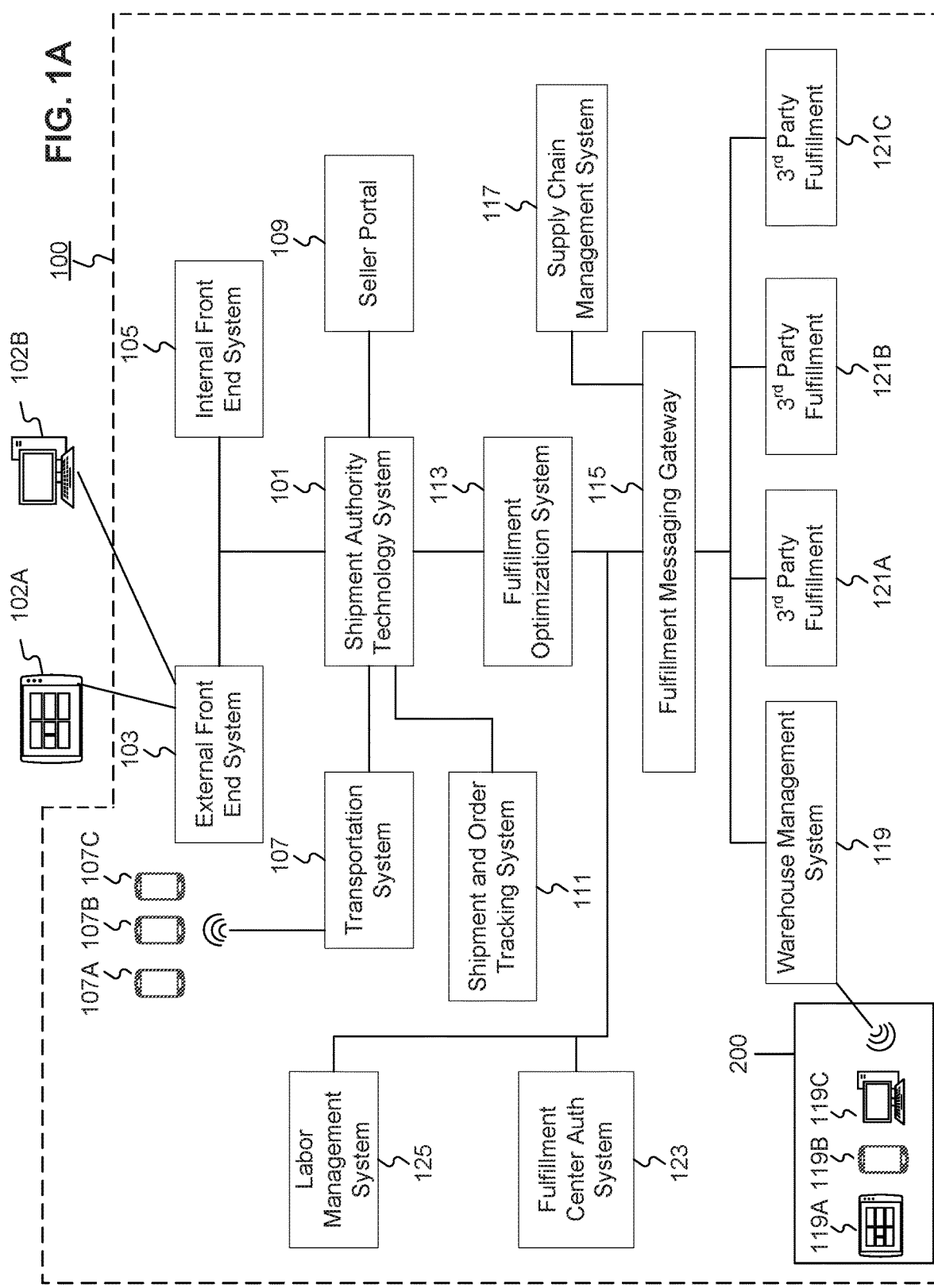
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

To overcome deficiencies associated with disconnected communications between one or more sellers or third-party sellers (referred to herein as seller) and fulfillment companies regarding cancelled orders, fulfillment companies may provide for an automated parcel retrieval system that may prevent the sunken costs associated with the seller that have to go through the manual task of attempting to retrieve one or more parcels or packages (referred to herein as package) associated with one or more cancelled orders that has entered the one or more parcel/mail carrier networks (referred to herein as carrier)—for example, USPS®, FedEx Corp., DHL, UPS Corp., TFI International, Purolator, or OnTrac Inc. Therefore, instead of the seller having to contact the carrier to cancel the shipment of the package to one or more customers that have cancelled the order of the package, the automatic and intelligent parcel retrieval system may automatically perform the task for the seller in the least amount of time possible. The automatic and intelligent parcel retrieval system may provide a benefit to the seller of not having to waste capital and resources in retrieving the package from carriers. This benefit to the seller may create an incentive for the seller to use the fulfillment companies' services to sell products to customers. In addition, the automated parcel retrieval system may minimize any contact that the seller or the carrier would have with the one or more customers when retrieving the packages.

For example, once one or more customers may have cancelled their orders of items associated with the package from the fulfillment companies, the automatic and intelligent parcel retrieval system may automatically obtain the tracking information associated with the cancelled orders from the seller. The automatic and intelligent parcel retrieval system may, in turn, efficiently (e.g., in the least amount of time and with the least capital and resources through to use of systems and methods) may retrieve the package before the one or more customers receive the package. The automatic and intelligent parcel retrieval system may, also, automatically be capable of contacting the one or more customers to alert them to reject the package being delivered to them by one or more carrier drivers (referred to herein as carrier driver). Furthermore, the automatic and intelligent parcel retrieval system may automatically be capable of providing the one or more customers with one or more return labels for the package that were, in fact, delivered to them after unsuccessful attempts to retrieve the package from the carrier. Moreover, when the automatic and intelligent parcel retrieval system may have successfully retrieved the packages associated with the cancelled orders by the one or more customers, the sellers may receive a notification that the packages may have been retrieved and shipped back to the seller's address.

Embodiments of the present disclosure are directed to systems and methods configured to automatically retrieve parcels associated with a seller having already shipped the package to customer when the customer may have actually cancelled the order.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
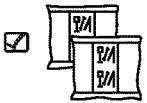
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
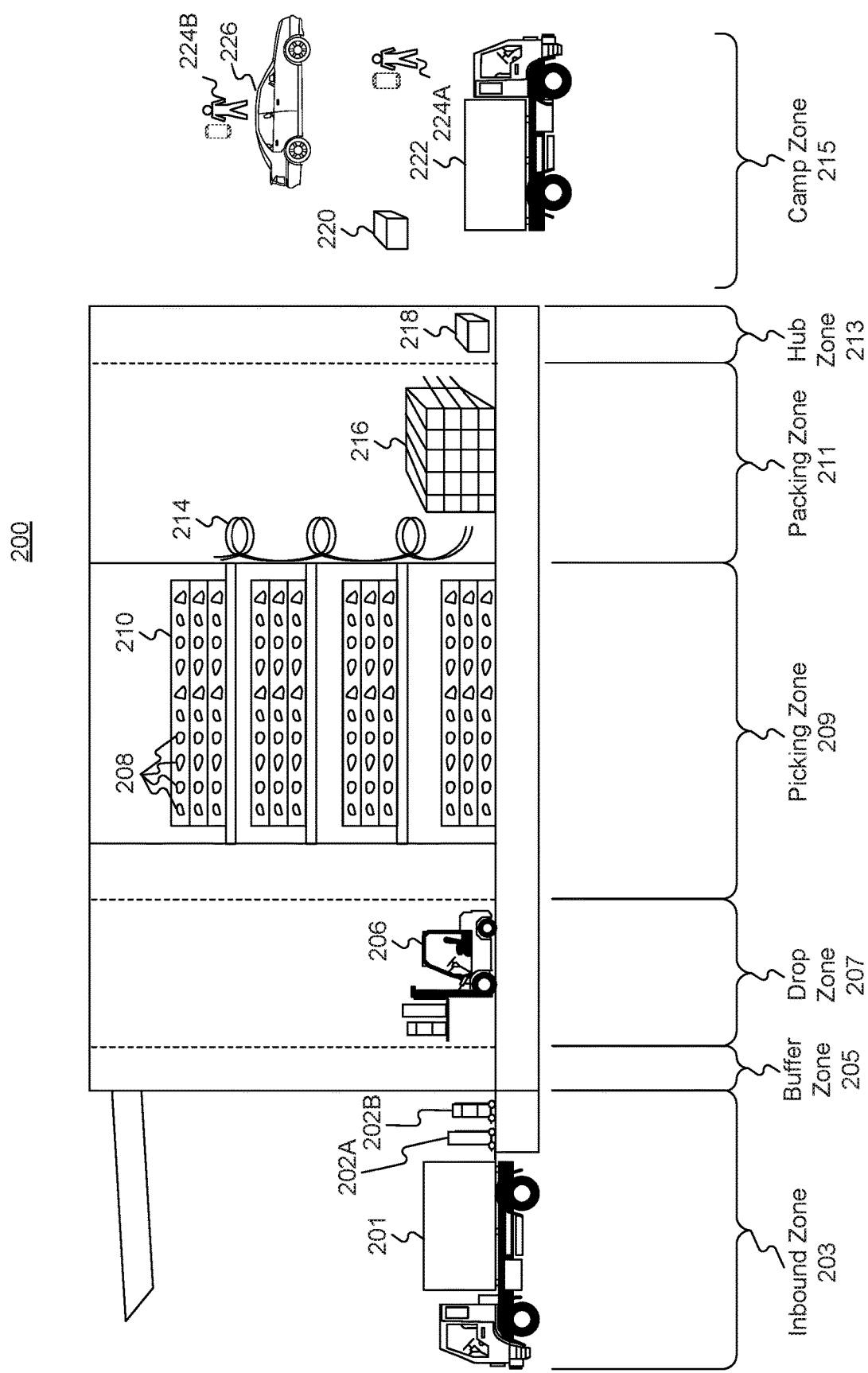
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3A:
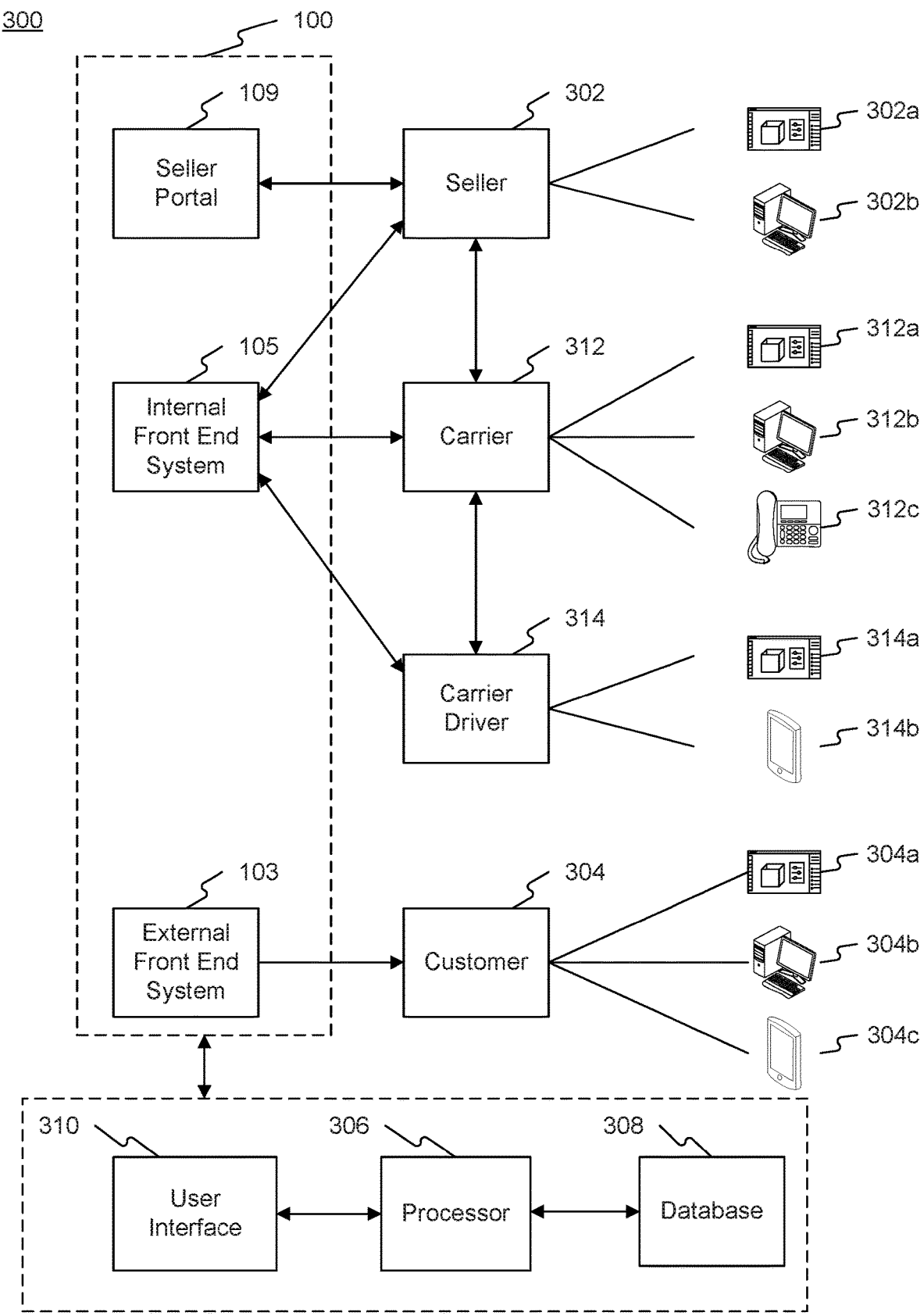
FIGS. 3A and 3B are block diagrams illustrating an exemplary system for automatic and intelligent parcel retrieval, consistent with the disclosed embodiments.
Figure 3B:
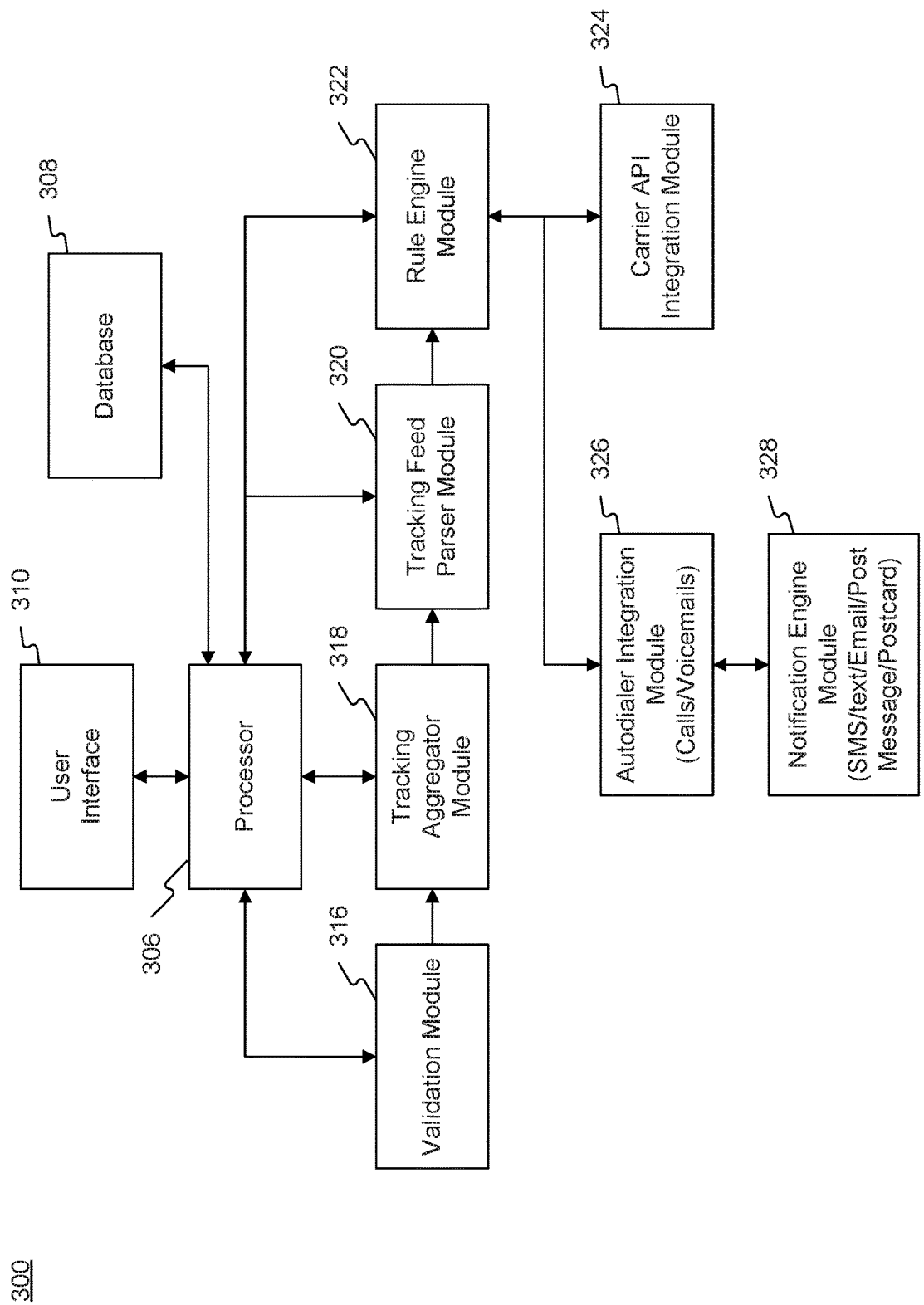

FIGS. 3A and 3B comprise block diagrams illustrating an exemplary system 300 for automatic and intelligent parcel retrieval, consistent with the disclosed embodiments. System 300 may automatically retrieve a package that a customer cancelled without a seller having to contact a carrier to retrieve the package. In another embodiment, system 300 may retrieve the package that the customer cancelled based on a request from the seller. System 300 may include system 100 and system 100's external front end system 103, internal front end system 105, and seller portal 109. System 300 may, additionally, execute all functions from system 100.

Furthermore, system 300 may include the seller portal 109 and/or internal front end system 105 to be communicably coupled with one or more seller systems 302 (referred to herein as seller 302). Seller 302 may be communicably coupled with seller portal 109 and/or internal front end system 105 via a webpage or web application 302a and a computer or server 302b.

In addition, system 300 may include the external front end system 103 to be communicably coupled with one or more customer 304 (referred herein as customer 304). Customer 304 may be communicably coupled with external front end system 103 via a webpage or web application 304a, a computer 304b, and a mobile device—e.g., mobile phones, smart phones, PDAs, or the like—304c. In one embodiment, external front end system 103 may be communicably coupled with customer 304 with an interactive voice response unit (IVR) on mobile device 304c, webpage or web application 304a, and computer 304b. In another embodiment, external front end 103 may be communicably coupled with customer 304 by sending one or more voicemails to mobile device 304c, webpage or web application 304a, and computer 304b. In yet another embodiment, external front end 103 may be communicably coupled with customer 304 by sending short message services (SMS) or text messages (referred herein as SMS/texts) to mobile device 304c, webpage or web application 304a, and computer 304b.

Furthermore, system 300 may include one or more processors 306 (referred to herein as processor 306), a database 308, and a user interface 310. User interface 310 is communicably coupled to internal front end system 105 to communicate with seller 302. In one embodiment, user interface 310 may be internal front end system 105. In another embodiment, user interface 310 may be communicably coupled with seller 302 via an application programing interface (API) with webpage or web application 302a and computer or server 302b.

Moreover, system 300 may include the internal front end system 105 to be communicably coupled with one or more carriers 312 (referred herein as carrier 312). Carrier 312 may be a network of one or more carriers. Carrier 312 may deliver a package associated with customer 304. Carrier 312 may be communicably coupled with internal front end 105 via a webpage or web application 312a, a computer or server 312b, and a telephone 312c. Seller 302 may communicate with carrier 312 to request that a package may be delivered to customer 403. In one embodiment, internal front end 105 may be communicably coupled with carrier 312 via an API with webpage or web application 312a and computer or server 312b. In yet another embodiment, internal front end 105 may be communicably coupled with carrier 312 on webpage or web application 312a and computer or server 312b. In yet another embodiment, internal front end 105 may be communicably coupled with carrier 312 with an IVR on telephone 312c, webpage or web application 312a, and computer or server 312b. In yet another embodiment, internal front end 105 may be communicably coupled with carrier 312 by sending one or more voicemails to telephone 312c, webpage or web application 312a, and computer or server 312b.

Furthermore, system 300 may include one or more carrier driver 314 (referred herein as carrier 314) that may be communicably coupled with internal front end system 105. Carrier driver 314 may be associated with carrier 312 to deliver a package to customer 304. Carrier driver 314 may be communicably coupled with internal front end 105 via a webpage or web application 314a and a mobile device—e.g., mobile phones, smart phones, PDAs, or the like—314b. Based on a request from seller 302 to deliver a package to customer 304, carrier 312 may communicate with carrier driver 314 to deliver the package to customer 304. In one embodiment, internal front end system 105 may be communicably coupled with carrier driver 314 with an IVR on mobile device 314b and webpage or web application 314a. In another embodiment, internal front end system 105 may be communicably coupled with carrier driver 314 by sending one or more voicemails to mobile device 314b and webpage or web application 314a. In yet another embodiment, internal front end system 105 may be communicably coupled with carrier driver 314 by sending SMS/texts to mobile device 314b and webpage or web application 314a.

Seller 302 may communicate with system 100 via the seller portal to upload or provide one or more products information (referred to herein as item) that seller 302 may wish to sell to customer 304. System 100 may advertise the item to the customer 304 via external front end system 103. Customer 304 may purchase the item from seller 302 where an order number may be associated with the purchased item. Seller 302 may be notified by system 100 that the item may have been purchased by customer 304. Processor 306 may store the order number in database 308. Furthermore, seller 302 may contact carrier 312 to arrange for the package of the item to be delivered to customer 304. Carrier 312, in turn, may provide seller 302 with a tracking number for the package associated with the order number of the purchased item by customer 304 to be delivered to customer 304. Seller 302 may send a waybill number associated with the package to be delivered to the customer 304 to system 300 via user interface 310 and/or internal front end system 105. The waybill number may include the seller 302's own order number and the tracking number for the package associated with the order number of the purchased item by customer 304. Seller 302 may send one or more waybill numbers each containing seller 302's own order numbers and tracking numbers for one or more packages associated with one or more order numbers of the purchased items by customer 304 via user interface 310 through a batch list of one or more waybill numbers. Processor 306 may store the waybill numbers provided by the seller 302 in database 308.

Customer 304 may notify system 300 to cancel the purchased item associated with the order number via external front end system 103 without seller 302 knowing that customer 304 may have cancelled the purchased item. System 300 may, automatically, via internal front end system 105, without seller 302 intervening, communicate with carrier 312 and/or carrier drive 314 to cancel the shipment of the package associated with the purchased item for customer 304. In another embodiment, seller 302 may communicate with system 300 requesting via user interface 310 to cancel the shipment of the purchased item by customer 304. System 300 may communicate with carrier 312 and/or carrier driver 314 to cancel the shipment of the package associated with the purchased item by customer 304 via internal front end system 105. If processor 306 is successful at retrieving the package from carrier 312 or carrier driver 314 before customer 304 may receive the package, processor 306 may request a reverse tracking number from carrier 312 for the package associated with the order number of the cancelled purchased item by customer 304 to be delivered back to seller 302. Processor 306 may send the reverse tracking number to seller 302 via user interface 310. In another embodiment, if the package is delivered to customer 304, processor 306 may notify customer 304 that the package may be retrieved by carrier 314 at customer 304's address for return to seller 302. Processor 306 may, then, provide seller 302 with a reverse tracking number for the package associated with the order number of the cancelled purchased item by customer 304 via user interface 310 after either retrieving the package from carrier 312, carrier driver 314, or customer 304.

Referring to FIG. 3B, system 300 may include processor 306, database 308, user interface 310, validation module 316, tracking aggregator module 318, tracking feed parser module 320, rule engine 322, carrier API integration module 324, autodialer integration module 326, and notification engine module 328. FIG. 3B illustrates an exemplary pictographic representation of system 300 where the layout and arrangements are exemplary only.

Validation module 316 (described below with respect to FIGS. 4 & 5) via processor 306 may validate that the waybill number from seller 302 may be associated with the order number of the purchased item by customer 304 in system 100. Furthermore, validation module 316 may validate that customer 304 may have cancelled the order of the purchased item in system 100. In another embodiment, validation module 316 may validate that the order number for the cancelled purchased item by customer 304 may be associated with the waybill number from seller 302 via a unique identifier. In yet another embodiment, validation module 316 may validate that a request from seller 302 to cancel the shipment of a package associated with a waybill number may be associated with an order number associated with a cancelled purchased item by customer 304.

Tracking aggregator module 318 (described below with respect to FIG. 5) via processor 306 may determine all tracking numbers from carrier 312 in all waybill numbers received from seller 302 associated with order numbers from items purchased by customer 304. Processor 306 may store the tracking numbers from carrier 312 associated with each purchased item by customer 304 in database 308.

Tracking feed parser module 320 (described below with respect to FIG. 5) via processor 306 may determine feed information from each tracking number from carrier 312 associated with an order number from a purchased item by customer 304. Feed information determined by tracking feed parser module 320 may include schedule information and contact information for a package associated with an order number of a purchased item by customer 304 injected inside carrier 312's complex network. Schedule information may include the package expected and actual times—time ranges, dates, and date ranges—at destinations—carrier 312, carrier 312's hubs, facilities, distribution centers, sorting stations, and carrier driver 314 and customer 304. Contact information may include phone numbers, addresses, email addresses, weblinks to access webpages or web applications, and building numbers associated with destinations. In another embodiment, tracking feed parser module 320 may continuously receive updated feed information from carrier 312 for any changes in schedule information or contact information. In one embodiment, changes in schedule information and contact information may include when the package has left one destination and arrived at another destination. Processor 306 may store feed information associated with tracking numbers for packages associated with order numbers of the cancelled purchased items by customer 304 in database 308.

Rule engine module 322 (described below with respect to FIGS. 6A & 6B) via processor 306 may retrieve the package associated with the order number of the cancelled purchased item by customer 304 from carrier 312, carrier 314, or customer 304. Rule engine module 322 may request a reverse tracking number from carrier 312 to ensure that the package associated with the order number of the cancelled purchased item by customer 304 may be in route back to seller 302. Rule engine module 322 may send a notification to seller 302 providing seller 302 the reverse tracking number for the package associated with the order number of the cancelled purchased item by customer 304. If rule engine module 322 is unsuccessful at retrieving the package associated with an order number from cancelled purchased item from customer 304, engine module 322 may request that carrier 312 send system 300 a reverse tracking number and a return label for the package associated with the order number of the cancelled purchased item by customer 304 so that customer 304 may attach the return label to the package delivered to customer 304 to send back to seller 302.

Carrier API integration module 324 (described below with respect to FIGS. 6A & 6B) via processor 306 may continuously communicate with current and past carrier 312 that may have shipped or may be shipping a package to customer 304 or seller 302. Carrier API integration module 324 may receive a cancellation shipment API from carrier 312 for the tracking number for the package associated with the order number of the purchased item by customer 304. The cancellation shipment API from carrier 312 may allow carrier API integration module 324 to send a cancel shipment message to carrier 312 via internal front end system 105 to cancel the shipment for the package associated with the order number of the cancelled purchased item by customer 304. In yet another embodiment, carrier 312 may send a success message to carrier API integration module 324 indicating that the cancel shipment message was successfully received by carrier 312, and carrier 312 may send a reverse tracking number for the package associated with the order number of the cancelled purchased item by customer 304. Rule engine module 322 may send a notification to seller 302 providing seller 302 the reverse tracking number.

Autodialer integration module 326 (described below with respect to FIGS. 6A & 6B) via processor 306 may send automated pre-recorded phone calls using IVR to carrier 312 on telephone 312c, webpage or web application 312a, and/or computer or server 312b via internal front end system 105 to alert carrier 312 that the shipment may be cancelled for the package associated with the order number of the cancelled purchased item by customer 304. In one embodiment, the automated pre-recorded phone calls may include the tracking number, the order number, the waybill number, the customer 304's address, and a request for the package to be returned to seller 302's address. In another embodiment, the automated pre-recorded phone calls may request from carrier 312 an acknowledgment of the package shipment cancellation by prompting carrier 312 to respond (e.g., by dialing, clicking, selecting, or touching a number) on telephone 312c, webpage or web application 312a, and/or computer or server 312b at carrier 312's respective destinations in its network (e.g., hubs, facilities, distribution centers, and sorting stations). Autodialer integration module 326 may receive the prompt by carrier 312 and request a reverse tracking number from carrier 312 via external front end system 105 for the package associated with the order number of the cancelled purchased item by customer 304. Carrier 312 may send a reverse tracking number to system 300 via internal front end system 105 with webpage or web application 312a, computer or server 312b, and/or telephone 312c.

In another embodiment, autodialer integration module 326 via processor 306 may send a voicemail using IVR to carrier 312 on telephone 312c, webpage or web application 312a, and computer or server 312b at carrier 312's respective destinations. The voicemail may include the tracking number, the order number, the waybill number, customer 304's address, and a request for the package to be returned to seller 302's address. In one embodiment, the voicemail may request carrier 312 to call a designated number acknowledging receipt of the package shipment cancellation and/or to provide a reverse tracking number through prompts on telephone 312c. In another embodiment, carrier 312 may send a reverse tracking number to system 300 via internal front end system 105 with webpage or web application 312a, computer or server 312b, and/or telephone 312c. In yet another embodiment, autodialer integration module 326 may cease to send voice calls and/or voicemails to carrier 312 once rule engine 322 receives a reverse tracking number.

In yet another embodiment, autodialer integration module 326 may send automated pre-recorded phone calls using IVR to carrier driver 314 on webpage or web application 314a and/or mobile phone 314b via internal front end system 105 to alert carrier driver 314 that the shipment may be cancelled for the package associated with the order number of the cancelled purchased item by customer 304. In one embodiment, the automated pre-recorded phone calls may include the tracking number, the order number, the waybill number, the customer 304's address, and a request for the package to be returned to seller 302's address. In another embodiment, the automated pre-recorded phone calls may request from carrier driver 314 an acknowledgment of the package shipment cancellation by prompting carrier driver 314 to respond (e.g., by dialing, clicking, selecting, or touching a number) on webpage or web application 314a and/or mobile phone 314b. Autodialer integration module 326 may receive the prompt by carrier driver 314 and request a reverse tracking number from carrier 312 via internal front end system 105 for the package associated with the order number of the cancelled purchased item by customer 304. Carrier 312 may send a reverse tracking number to system 300 via internal front end system 105 with webpage or web application 312a, computer or server 312b, and/or telephone 312c.

In another embodiment, autodialer integration module 326 may send a voicemail using IVR to carrier driver 314 on webpage or web application 314a and/or mobile phone 314b. The voicemail may include the tracking number, the order number, the waybill number, the customer 304's address, and a request for the package to be returned to seller 302's address. In one embodiment, the voicemail may request carrier driver 314 to call a designated number acknowledging receipt of the package shipment cancellation and/or to provide a reverse tracking number by prompts on webpage or web application 314a and/or mobile phone 314b. In another embodiment, carrier 312 may send a reverse tracking number to system 300 via internal front end system 105 with webpage or web application 312a, computer or server 312b, and/or telephone 312c. In yet another embodiment, autodialer integration module 326 may cease to send voice calls and/or voicemails to carrier driver 314 once rule engine 322 may receive a reverse tracking number.

In yet another embodiment, autodialer integration module 326 may send automated pre-recorded phone calls using IVR to customer 304 on webpage or web application 304a, computer or server 304b, and/or mobile phone 304c via external front end system 103 to notify customer 304 not to accept the package associated with the order number of the cancelled purchased item by customer 304 when carrier driver 314 may deliver the package. In one embodiment, the automated pre-recorded phone calls may include the tracking number, the order number, the customer 304's address, and the estimated time of delivery of the package. In another embodiment, the automated pre-recorded phone calls may request from customer 304 an acknowledgment that customer 304 may have successfully rejected the package from carrier driver 314 by prompting customer 304 to respond (e.g., by dialing, clicking, selecting, or touching a number) on webpage or web application 304a, computer or server 304b, and/or mobile phone 304c. Autodialer integration module 326 may receive the prompt by customer 304 external front end system 103 and request a reverse tracking number from carrier 312 for the package associated with the order number cancelled by customer 304. Carrier 312 may send a reverse tracking number to system 300 via internal front end system 105 with webpage or web application 312a, computer or server 312b, and/or telephone 312c.

In another embodiment, autodialer integration module 326 may send a voicemail using IVR to customer 304 on webpage or web application 304a, and computer or server 304b, and/or mobile phone 304c. The voicemail may include the tracking number, the order number, the customer 304's address, and the estimated time of delivery of the package. In one embodiment, the voicemail may request customer 304 not to accept the package associated with the order number of the cancelled purchased item by customer 304 when carrier driver 314 may deliver the package. In another embodiment, the voicemail may request customer 304 to acknowledge receipt that customer 304 may have successfully rejected the package from carrier driver 314 by prompting customer 304 to respond (e.g., by dialing, clicking, selecting, or touching a number) on webpage or web application 304a, computer or server 304b, and/or mobile phone 304c. Autodialer integration module 326 may receive the prompt by customer 304 and request carrier 312 to send a reverse tracking number to system 300 via internal front end system 105 with webpage or web application 312a, computer or server 312b, and/or telephone 312c. Carrier 312 may send a reverse tracking number to system 300 via internal front end system 105 with webpage or web application 312a, computer or server 312b, and/or telephone 312c. In yet another embodiment, autodialer integration module 326 may cease to send voice calls and/or voicemails to customer 304 once rule engine 322 may receive a reverse tracking number.

In yet another embodiment, if rule engine 322 is unsuccessful at retrieving the package associated with the order number of the cancelled purchased item by customer 304, autodialer integration module 326 may send pre-recorded phone calls and voicemails to customer 304 to notify customer 304 to check an email and/or post card in the mail from system 300, which may include a return label to attach to the package to mail back to seller 302.

Notification engine module 328 (described below with respect to FIGS. 6A & 6B) may be implemented in a manner similar to autodialer integration module 326. In one embodiment, notification engine module 328 may send carrier 312 emails and/or post messages on webpage or web application 312a, computer or server 312b, and/or telephone 312c. The emails and messages on webpage or web application 312a, computer 312b, and/or telephone 312c may include the tracking number, the order number, the waybill number, the customer 304's address, and a request for the package associated with the order number of the cancelled purchased item by customer 304 to be returned to seller 302's address. In another embodiment, the emails and messages may request from carrier 312 an acknowledgment of the package shipment cancellation by prompting carrier 312 to respond (e.g., by dialing, clicking, selecting, or touching a radio button or selection) on the email or message. Notification engine module 328 may receive the prompt by carrier 312 and request a reverse tracking number from carrier 312 via internal front end system 105 for the package associated with the order number of the cancelled purchased item by customer 304. Carrier 312 may send a reverse tracking number to system 300 via internal front end system 105 with webpage or web application 312a, computer or server 312b, and/or telephone 312c. In yet another embodiment, notification engine module 328 may cease to send the emails and posted messages to carrier 312 once rule engine 322 may receive a reverse tracking number.

In another embodiment, notification engine module 328 may send carrier driver 314 emails, SMS/texts, and post messages on webpage or web application 314a and/or mobile phone 314b. The emails, SMS/texts, and posted messages on webpage or web application 314a and/or mobile phone 314b may include the tracking number, the order number, the waybill number, the customer 304's address, and a request for the package to be returned to seller 302's address. In another embodiment, the emails, SMS/texts, and posted messages may request from carrier driver 314 an acknowledgment of the package shipment cancellation by prompting carrier driver 314 to respond (e.g., by dialing, clicking, selecting, or touching a radio button or selection) on the emails and posted messages or to reply to the SMS/texts. Notification engine module 328 may receive the prompt by or SMS/text from carrier driver 314 and request a reverse tracking number from carrier 312 via internal front end system 105 for the package associated with the order number cancelled by customer 304. Carrier 312 may send a reverse tracking number to system 300 via internal front end system 105 with webpage or web application 312*a*, computer or server 312*b*, and/or telephone 312*c*. In yet another embodiment, notification engine module 328 may cease to send the emails, SMS/texts, and posted messages to carrier driver 314 once rule engine 322 may receive a reverse tracking number.

In yet another embodiment, notification engine module 328 may send customer 304 emails, SMS/texts, and post messages on webpage or web application 304*a*, computer 304*b*, and/or mobile phone 304*c*. In yet another embodiment, notification engine module 328 may send postcards to customer 304's address alerting customer 304 not to accept the package associated with the order number of the cancelled purchased item by customer 304 and to check customer 304's emails, SMS/texts, and post messages on webpage or web application 304*a*, computer 304*b*, and/or mobile phone 304*c* for further instructions. The emails, SMS/texts, and posted messages on webpage or web application 304*a*, computer 304*b*, and/or mobile phone 304*c* may include the tracking number, the order number, the customer 304's address, and the estimated time of delivery of the package. In one embodiment, the emails, SMS/texts, and posted messages may request customer 304 not to accept the package associated with the order number of the cancelled purchased item by customer 304 when carrier driver 314 may deliver the package. In another embodiment, the emails, SMS/texts, and posted messages may request customer 304 to acknowledge receipt that customer 304 may have successfully rejected the package from carrier driver 314 by prompting customer 304 to respond (e.g., by dialing, clicking, selecting, or touching a radio button or selection) on the emails and posted messages or to respond to the SMS/texts. Notification engine module 328 may receive the prompt by or SMS/text from customer 304 and request a reverse tracking number from carrier 312 via external front end system 103 for the package associated with the order number cancelled by customer 304. Carrier 312 may send a reverse tracking number to system 300 via internal front end system 105 with webpage or web application 312*a*, computer or server 312*b*, and/or telephone 312*c*. In yet another embodiment, notification engine module 328 may cease to send the emails, SMS/texts, and posted messages to customer 304 once rule engine 322 may receive a reverse tracking number.

In yet another embodiment, if rule engine 322 is unsuccessful at retrieving the package associated with the order number of the cancelled purchased item by customer 304, notification engine module 328 may send emails, SMS/texts, and posted messages to customer 304 to notify customer 304 to check an email and/or postcard in the mail from system 300, which may include a return label to attach to the package to mail back to seller 302. In another embodiment, notification engine 328 may send customer 304 a post card that may include a return label to attach to the package to mail back to seller 302.

Figure 4:
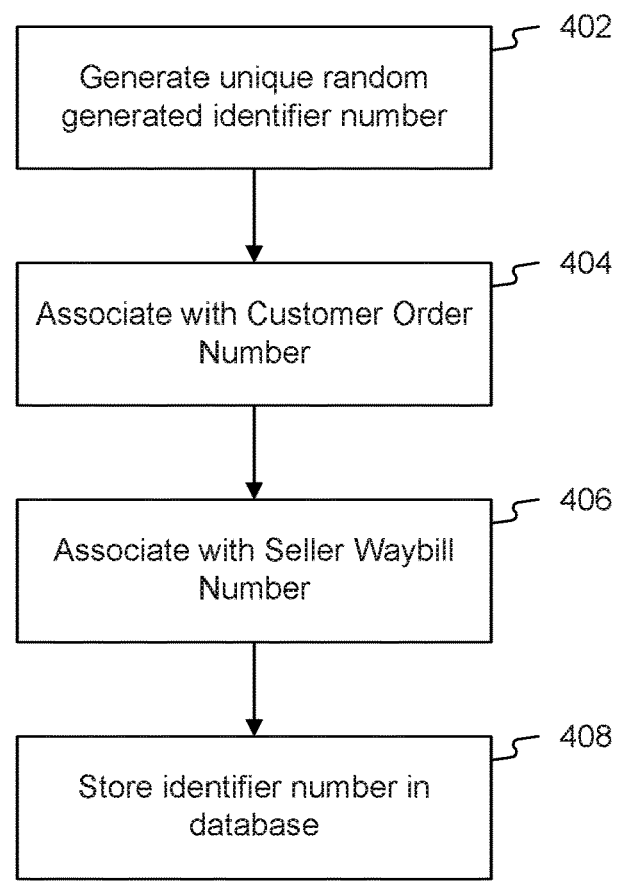
FIG. 4 is a flow chart of an exemplary method of associating customers orders with sellers' waybill numbers, consistent with the disclosed embodiments.

FIG. 4 is a flow chart of an exemplary method 400 of associating customers' orders with sellers' waybill numbers, consistent with the disclosed embodiments. The steps of method 400 may be performed by processor 306. The steps of method 400 depict an embodiment detailing validation module 316. Processor 306 in method 400 may execute functions in validation module 316. Processor 306 may execute method 400 once customer 304 has purchased an item from seller 302.

Processor 306 may detect that customer 304 may have purchased an item in system 100. System 100 may generate an order number associated with the purchased item by customer 304. System 100 may notify seller 302 that the item was purchased by customer 304. Seller 302 may, in turn, send system 100 a waybill number for the item purchased by customer 304, which may be received by processor 306 via user interface 310. The waybill number, from carrier 312, received by processor 306 may include a tracking number for the package associated with the order number of the purchased item by customer 304, which may be inserted in carrier 312's network for delivery to customer 304.

At step 402, processor 306 may randomly generate a unique identifier based on the purchased item by customer 304. Processor 306 may store the unique identifier in database 308. In some embodiments, the unique identifier may never be repeated, and processor 306 may utilize a number of algorithms to randomly generate the unique identifier. In one embodiment, the algorithms that processor 306 may use to randomly generate the unique identifier comprise hardware random-number generators (HRNGS), pseudo-random number generators (PRNGS), and cryptographically secure pseudo-random number generators (CSPRNGS). In yet another embodiment, the unique identifier may be used to continuously store more information comprising order numbers, waybill numbers, tracking numbers, reverse tracking numbers, APIs, carriers' schedule information and contact information, customers' information, messages, and acknowledgement receipts. In yet another embodiment, the unique identifier may comprise the functions of a tuple, a dictionary, a list, an array, a matrix, a class, and/or an object to store more information.

At step 404, processor 306 may associate the unique identifier with the order number of the purchased item by customer 304. In one embodiment, processor 306 may store the order number of the purchased item in the unique identifier where, in one embodiment, the order number may be added to an element inside the unique identifier.

At step 406, processor 306 may receive a waybill number from seller 302. Processor 306 may associate the unique identifier of the order number associated with the purchased item by customer 304 with the waybill number from seller 302. Processor 306 may now be able to identify the order number of the item purchased by customer 304 with the waybill number from seller 302.

At step 408, processor 306 may store the waybill number from seller 302 in the unique identifier in database 308. The unique identifier may include the order number associated with the item purchased by customer 304 and the waybill number from seller 302 associated with the same item purchased by customer 304. The waybill number from sell 302 may also include the tracking number from carrier 312, which may include feed information about the package associated with the order number of the cancelled purchased item by customer 304.

Figure 5:
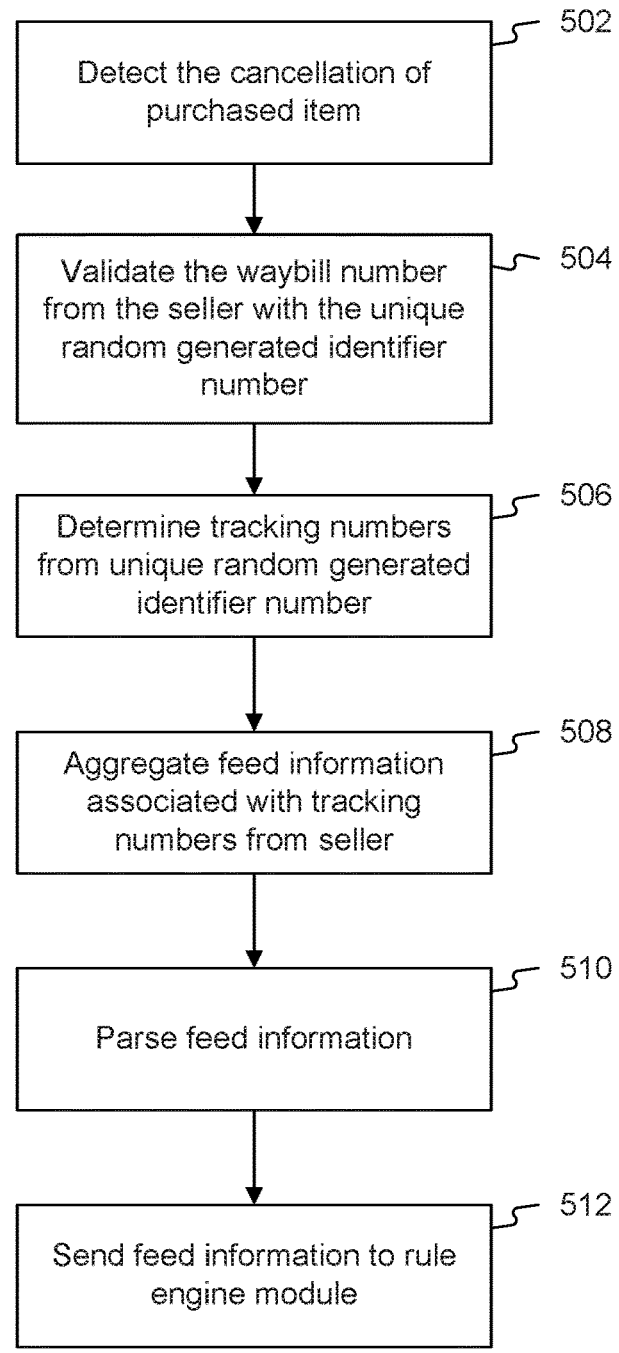
FIG. 5 is a flow chart of an exemplary method of determining tracking feed information from carriers, consistent with the disclosed embodiments.

FIG. 5 is a flow chart of an exemplary method 500 of determining tracking feed information from carriers, consistent with the disclosed embodiments. The steps of method 500 may be performed by processor 306. The steps of method 500 depicts an embodiment detailing operations performed by validation module 316, tracking aggregator module 318, and tracking feed parser module 320. Processor 306 in method 500 may execute functions in validation module 316, tracking aggregator module 318, and tracking feed parser module 320. Processor 306 may execute method

500 once customer 304 may have cancelled the purchased item associated with the order number and the waybill number from seller 302.

At step 502, processor 306 may detect that customer 304 may have cancelled the purchased item associated with the order number and the waybill number. Processor 306 may detect that customer 304 may have cancelled the purchased item by monitoring customer 304's activities on external front end system 103. Seller 302 may or may not be aware that customer 304 may have cancelled the purchased item associated with the order number and the waybill number.

At step 504, processor 306 may execute the functions of validation module 316 by automatically validating the waybill number from seller 302 by using the unique identifier in database 308 associated with the waybill number from seller 302 and the order number associated with the cancelled purchased item by customer 304. In one embodiment, processor 306 may receive from seller 302 via user interface 310 a waybill number associated with a cancelled purchased item by customer 304. In another embodiment, processor 306 may receive, from seller 302, multiple batch list of waybill numbers associated with multiple cancelled purchased items by customer 304 via user interface 310. Processor 306 may validate each waybill number from each seller 302 by using the unique identifier containing the order number and the matching waybill number to ensure that one seller 302 may not mistakenly request the cancellation of the shipment of a second seller 302 for a package associated with an order number of an purchased item by customer 304 in carrier 312. Processor 306 may assign a validated status to each unique identifier having a validated waybill number. Processor 306 may store the validated status via each unique identifier having the validated waybill number in database 308.

At step 506, processor 306 may execute the functions of tracking aggregator module 318 by determining the tracking number in the unique identifier having the validated status from step 504. The unique identifier may include the order number and the validated waybill number from the seller 302 for the cancelled purchased item by customer 304. In another embodiment, processor 306 may determine multiple tracking numbers in multiple unique identifiers having the validated status from step 504. Processor 306 may store each tracking number having the validated status in the unique identifier in database 308.

At step 508, processor 306 may execute the functions of tracking aggregator module 318. Processor 306 may aggregate the feed information from carrier 312 in the unique identifier having the validated status stored in database 308 associated with a tracking number for the package associated with the order number of the cancelled purchased item by customer 304. Processor 306 may store the feed information from carrier 312 in the unique identifier having the validated status in database 308. Processor 306 may continuously aggregate the feed information from carrier 312 in the unique identifier having the validated status stored in database 308 associated with the tracking number for the package associated with the order number of the cancelled purchased item by customer 304. Processor 306 may continuously store the feed information from carrier 312 in the unique identifier having the validated status in database 308.

At step 510, processor 306 may execute the functions of tracking feed parser module 320. Processor 306 may parse each feed information in the unique identifier having the validated status. Processor 306 may parse each feed information by storing in the unique identifier in database 308 the actual and expected schedule information and contact information that the package associated with the order number of the cancelled purchased item by customer 304 may be at different destinations. Processor 306 may store the parsed feed information in the unique identifier having the validated status in database 308.

At step 512, processor 306 may send the unique identifier having the validated status and the feed information to rule engine module 322. Processor 306 may store reverse tracking numbers for the package associated with the order number of the cancelled purchased item by customer 304 received from carrier 312 in the unique identifier having the validated status in database 308. Processor 306 may store received cancellation shipment APIs from carrier 312 in the unique identifier having the validated status in database 308.

Figure 6A:
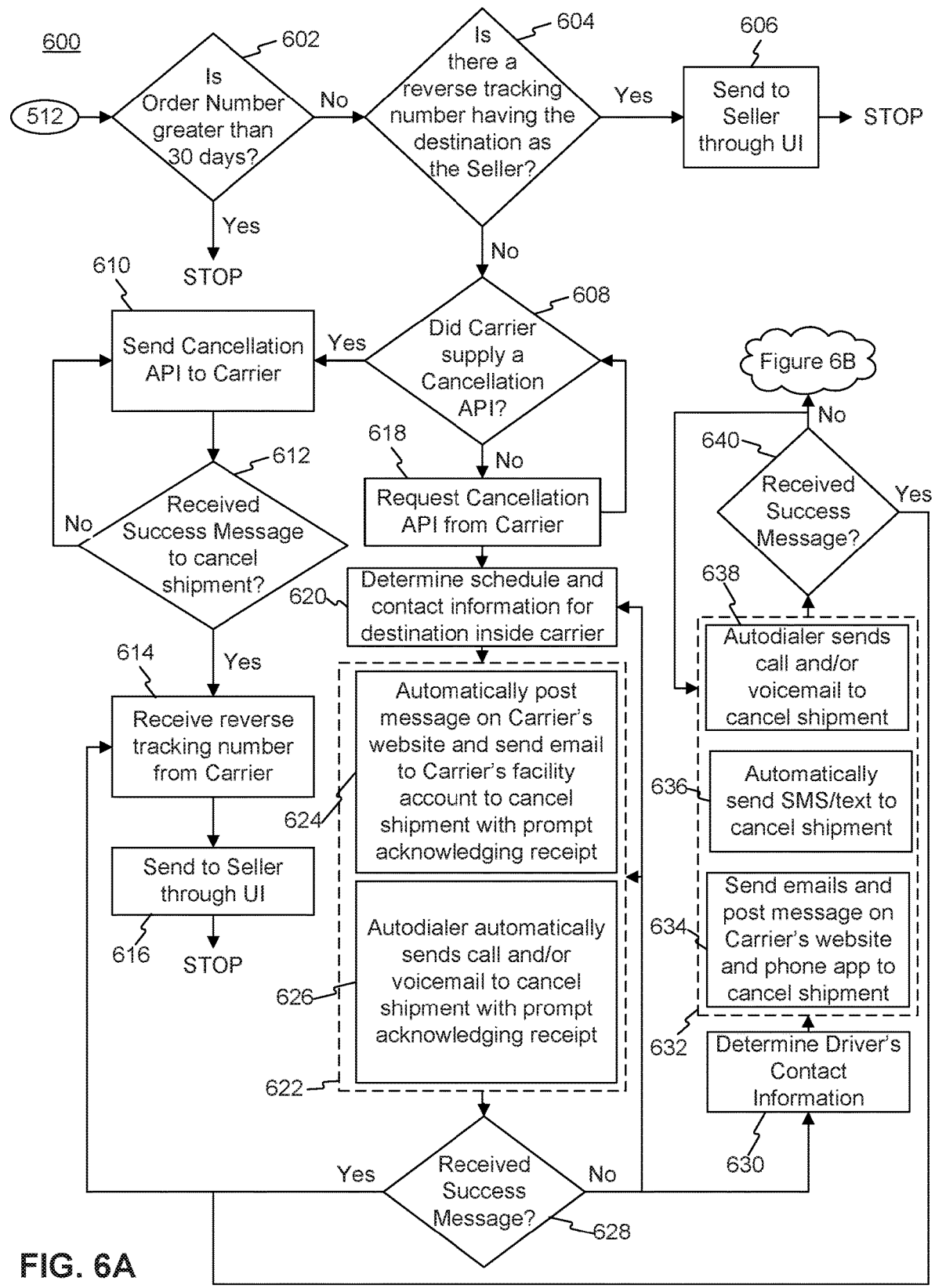
FIGS. 6A and 6B is a flow chart of an exemplary method of automatically and intelligently retrieving parcels, consistent with the disclosed embodiments.
Figure 6B:
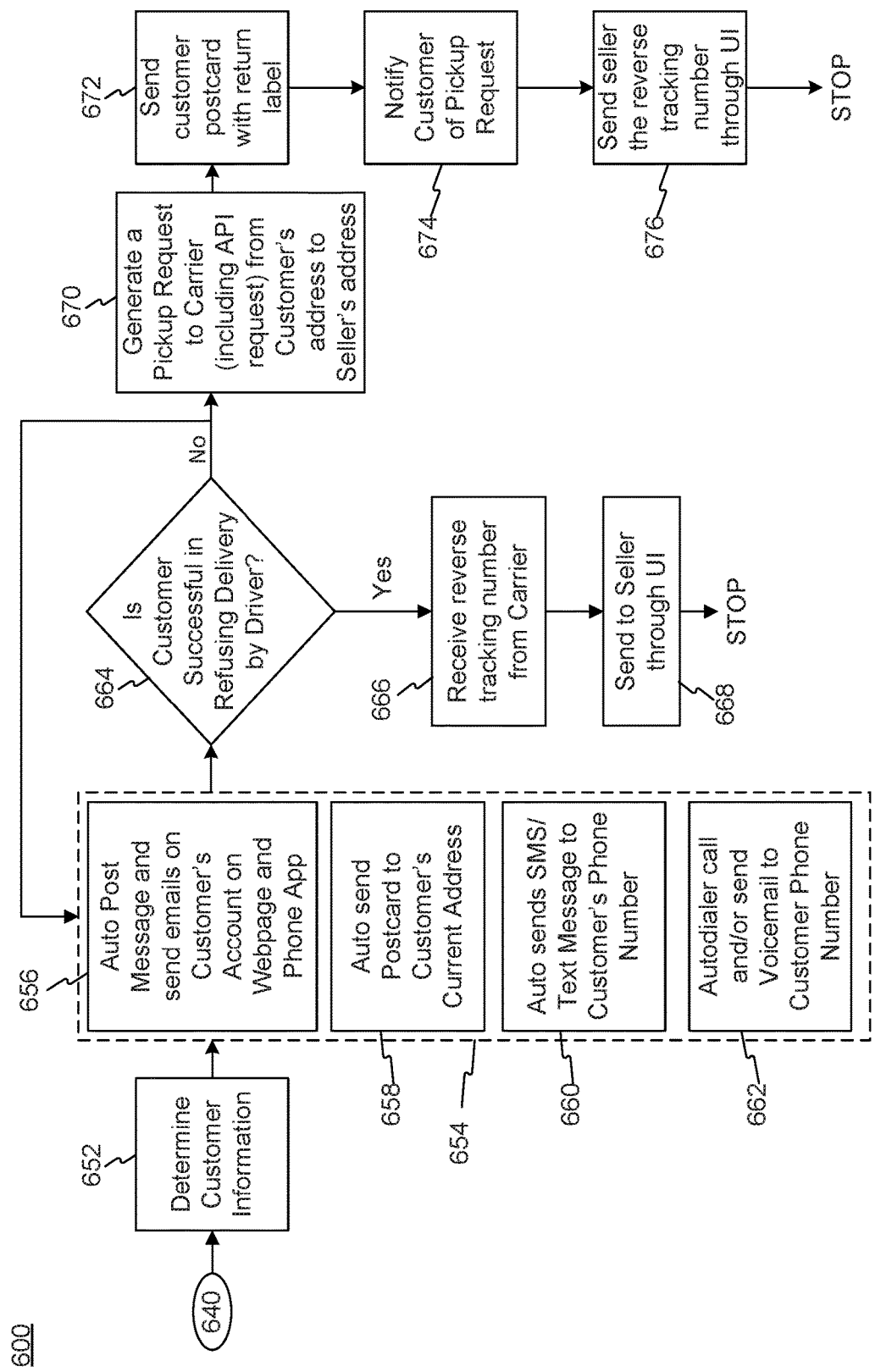

FIGS. 6A and 6B together are flow charts of an exemplary method 600 of automatically retrieving parcels, consistent with the disclosed embodiments. Processor 306 may execute the steps in method 600. The steps of method 600 depicts an embodiment detailing steps to execute carrier API integration module 324, autodialer integration module 326, and notification engine module 328. After processor 306 may send the unique identifier to rule engine 322 where the unique identifier may include the order number, the waybill number, the tracking number, the feed information, the cancellation shipment API, and the reverse tracking number, at step 602, processor 306 may determine from the unique identifier whether an order number of the cancelled purchased item by customer 304 may be older than a set number of days, for example 30 days. If processor 306 determines that the order number is than the set number of days, for example 30 days (step 602—yes), then processor 306 stops attempting to retrieve a package associated with the order number of the cancelled purchased item by customer 304 because seller 302 may have received the package.

However, if processor 306 determines that the order number is less than or equal to the set number of days, for example 30 days (step 602—no), then at step 604, processor 306 may determine if the unique identifier includes a reverse tracking number for seller 302 for the package associated with the order number of the cancelled purchased item by customer 304. If processor 306 determines that the unique identifier may include the reverse tracking number (step 604—yes), then at step 606, processor 306 may send seller 302 the reverse tracking number for the package associated with the order number of the cancelled purchased item by customer 304 via user interface 310 where carrier 312 may send the package back to seller 302. Processor 306 may stop attempting to retrieve the package associated with the order number of the cancelled purchased item by customer 304.

However, if processor 306 determines that the unique identifier may not include the reverse tracking number (step 604—no), then at step 608, processor 306 may determine whether the unique identifier may include a cancellation API from carrier 312. If processor 306 determines that the unique identifier may include the cancellation API (step 608—yes), then at step 610, processor 302 may execute carrier integration module 324 to send a cancel shipment message to carrier 312 for the package associated with the order number of the cancelled purchased item by customer 304.

At step 612, processor 306 may determine whether the carrier integration module 324 may have received from carrier 312 a success message confirming the shipment cancellation for the package associated with the order number of the cancelled purchased item by customer 304. If processor 306 determines that carrier integration module 324 may not have received the success message from carrier 312 (step 612—no), then processor 306 performs step 610.

Processor 306 may repeat steps 612—no and 610 for a set number of times, for example 5 times, until processor 306 receives the success message from carrier 312 (steps 612—yes). If processor 306 does not receive the success message from carrier 312 after the set number of times, then processor 306 may proceed to step 620.

However, if processor 306 determines that the carrier integration module 324 may have received the success message from carrier 312 (step 612—yes), then at step 614, processor 306 receives a reverse tracking number from carrier 312 in the unique identifier for storing in database 308. In another embodiment, processor 306 may store the success message from carrier 312 confirming the shipment cancellation in the unique identifier in database 308.

At step 616, processor 306 may send the reverse tracking number for the package associated with the order number of the cancelled purchased item by customer 304 to seller 302 via user interface 310 where carrier 312 may send the package back to seller 302. Processor 306 may stop attempting to retrieve the package from carrier 312.

However, if processor 306 determines that the unique identifier may not include a cancellation API from carrier 312 (step 608—no), then at step 608, processor 306 may request a cancellation API from carrier 312. If processor 306 does not receive a cancellation API from carrier 312, processor 306 may continuously repeat steps 608 and 618 for a set number of times, for example 5 times, after which, processor 306 may execute step 620. In one embodiment, processor 306 may continuously repeat steps 608 and 618 while processor 306 may execute step 620.

At step 620, processor 306 may determine, from feed information, the schedule information and contact information for the package associated with the order number of the cancelled purchased item by customer 304 inside carrier 312.

At step 622, processor 306 may simultaneously execute autodialer integration module 326 and notification engine module 328. At step 624, processor 306 may send phone calls and voicemails via autodialer integration module 326 requesting the shipment cancellation of the package associated with the order number of the cancelled purchased item by customer 304 to the destination inside carrier 312 having the package. At step 626, processor 306 may send SMS/texts, emails, and posted messages via notification engine module 328 requesting the shipment cancellation of the package associated with the order number of the cancelled purchased item by customer 304 to the destination inside carrier 312 having the package.

At step 628, processor 306 may determine whether autodialer integration module 326 and/or notification engine module 328 may have received an acknowledgment from carrier 312. If processor 306 determines that autodialer integration module 326 and/or notification engine 328 may have received an acknowledgment via a success message confirming the shipment cancellation for the package associated with the order number of the cancelled purchased item by customer 304 (step 628—yes), then processor 306 performs the steps 614 and 616. Processor 306 may store in the unique identifier in database 308 the acknowledgment contained in the success message confirming the shipment cancellation for the package associated with the order number of the cancelled purchased item by customer 304.

However, if processor 306 determines that autodialer integration module 326 and/or notification engine 328 may not have received an acknowledgment via a success message confirming the shipment cancellation for the package associated with the order number of the cancelled purchased item by customer 304 (step 628—no), then processor 306 may continuously repeat steps 622 and 628—no for a set number of times at the destination inside carrier 312, for example 5 times, after which, processor 306 may determine the next destination inside carrier 312 according to the feed information, which may include the schedule information and contact information. If processor 306 is successful at receiving an acknowledgment via a success message from carrier 312 (step 628—yes), then processor 306 executes steps 614 and 616.

However, if processor 306 is not successful at receiving an acknowledgment via a success message from carrier 312 (step 628—no) inside carrier 312, and the package may have been in route for delivery to customer 304 by carrier driver 314, then at step 630, processor 306 determines from feed information the schedule information and contact information for carrier driver 314 for the package associated with the order number of the cancelled purchased item by customer 304. At step 632, processor 306 may simultaneously execute autodialer integration module 326 and notification engine module 328.

At step 634, processor 306 may send emails and posted messages via notification engine 328 requesting the shipment cancellation of the package associated with the order number of the cancelled purchased item by customer 304 to carrier driver 314. At step 636, processor 306 may send SMS/texts via notification engine 328 requesting the shipment cancellation of the package associated with the order number of the cancelled purchased item by customer 304 to carrier driver 314. At step 638, processor 306 may send phone calls and voicemails via autodialer integration module 326 requesting the shipment cancellation of the package associated with the order number of the cancelled purchased item by customer 304 to carrier driver 314.

At step 640, processor 306 may determine whether autodialer integration module 326 and/or notification engine module 328 may have received an acknowledgment from carrier driver 314. If processor 306 determines that autodialer integration module 326 and/or notification engine 328 may have received an acknowledgment via a success message confirming the shipment cancellation for the package associated with the order number of the cancelled purchased item by customer 304 (step 640—yes), then processor 306 performs the steps 614 and 616. Processor 306 may store in the unique identifier in database 308 the acknowledgment contained in the success message confirming the shipment cancellation for the package associated with the order number of the cancelled purchased item by customer 304.

However, if processor 306 is not successful at receiving an acknowledgment via a success message from carrier driver 314 (step 640—no), then processor 306 may repeat steps 632 and 640—no for a set number of times, for example 5 times, to carrier driver 314 after which, processor 306 may execute steps 614 and 616 for step 640—yes. However, if processor 306 is not successful at receiving an acknowledgment via a success message from carrier driver 314 after the set number of attempts in steps 632 and 640, then processor 306 proceeds to FIG. 6B.

Referring to FIG. 6B, after performing step 640 and the package is still en route for delivery to customer 304 by carrier driver 314, then at step 652, processor 306 determines from feed information the schedule information and contact information for customer 304. At step 654, processor 306 may simultaneously execute autodialer integration module 326 and notification engine module 328.

At step 656, processor 306 may send posted messages and emails via notification engine module 328 requesting customer 304 to not accept the package associated with the order number of the cancelled purchased item by customer 304 from carrier driver 314.

At step 658, processor 306 may send a post card via notification engine module 328 requesting customer 304 to not accept the package associated with the order number of the cancelled purchased item by customer 304 from carrier driver 314 and to check customer 304's posted messages, emails, SMS/texts, phone calls, and voicemails containing further instructions.

At step 660, processor 306 may send SMS/texts via notification engine module 328 requesting customer 304 to not accept the package associated with the order number of the cancelled purchased item by customer 304 from carrier driver 314.

At step 662, processor 306 may send phone calls and voicemails via autodialer integration module 326 requesting customer 304 to not accept the package associated with the order number of the cancelled purchased item by customer 304 from carrier driver 314.

At step 664, processor 306 may determine whether autodialer integration module 326 and/or notification engine module 328 may have received an acknowledgment from customer 304 confirming that customer 304 may have been successful at not accepting delivery of the package associated with the order number of the cancelled purchased item by customer 304. If processor 306 determines that autodialer integration module 326 and/or notification engine 328 may have received an acknowledgment from customer 304 (step 664—yes), then at step 666, processor 306 receives a reverse tracking number from carrier 312 and stores in the unique identifier in database 308. In another embodiment, processor 306 may receive an acknowledgment from customer 304 that the package associated with the order number of the cancelled purchased item was refused by customer 304 for storing in the unique identifier in database 308.

At step 668, processor 306 may send the reverse tracking number for the package associated with the order number of the cancelled purchased item by customer 304 to seller 302 via user interface 310 where carrier 312 may send the package back to seller 302. Processor 306 may stop attempting to retrieve the package from carrier 312, carrier driver 314, and customer 304.

However, if processor 306 is not successful at receiving an acknowledgment from customer 304 (step 664—no), then processor 306 may repeat steps 654 and 664—no for a set number of times, for example 5 times, to customer 304 after which, processor 306 may execute steps 666 and 668 for step 664—yes. However, if processor 306 is not successful at receiving an acknowledgment from customer 304 after the set number of attempts of steps 654 and 664, then at step 670, processor 306 may send a pick up request from customer 304's address to carrier 312 for the package associated with the order number of the cancelled purchased item by customer 304. Processor 306 may receive a reverse tracking number and a return label including seller 302's address from carrier 312 for the package associated with the order number of the cancelled purchased item by customer 304. In another embodiment, processor 306 may execute carrier API integration module 324 to send a pick up request API to carrier 312, and carrier 312 may send a success message to carrier API integration module 324 with a reverse tracking number. In yet another embodiment, the success message from carrier 312 via carrier API integration module 324 may allow processor 306 to generate a return label including seller 302's address for customer 304. In yet another embodiment, processor 306 may store in the unique identifier the success message from carrier 312 in database 308.

At step 672, processor 306 may execute notification engine module 328 to send a postcard to customer 304's address, which may include the return label to seller 302's address. In one embodiment, the postcard may be an envelope containing the return label to seller 302's address. The return label may be for customer 304 to attach to the package associated with the order number of the cancelled purchased item by customer 304 that customer 304 may have been unsuccessful at not accepting from carrier driver 314.

At step 674, processor 306 may execute autodialer integration module 326 and notification engine module 328 where processor 306 may send phone calls, voicemails, SMS/texts, emails, and post messages on webpage or web application 304*a*, computer 304*b*, and mobile phone 304*c* via external front end system 103 to notify customer 304 that the return label including seller 302's address is coming in the mail. In yet another embodiment, notification engine module 328's SMS/texts, emails, and posted messages may contain the return label for customer 304 to print.

At step 676, processor 306 may send seller 302 the reverse tracking number for the package associated with the order number of the cancelled purchased item by customer 304. Processor 306 may stop attempting to retrieve the package from carrier 312 and customer 304.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for an automatic and intelligent parcel retrieval, the system comprising:
   a database;
   a memory storing instructions; and
   at least one processor configured to execute the instructions to perform steps comprising:
      receiving an order number for an item purchased by the customer;
      receiving from a seller a waybill number associated with the order number for the item purchased by the customer and a carrier delivering a package for the item purchased by the customer;
      generating a unique identifier including the order number for the item purchased by the customer and the waybill number from the seller;
      detecting a cancellation of the order number associated with the item purchased by the customer;
      determining a tracking number in the unique identifier, associated with the waybill number from the seller and the carrier delivering the package, based on the cancellation of the order number;
      aggregating information in the unique identifier associated with the tracking number from the seller;
      parsing the aggregated information in the unique identifier for storing in the database;
      sending a notification to the carrier delivering the package to cancel shipment of the package to the customer based on the unique identifier associated with the cancellation of the order number;
      determining a number of days associated with the order number;
      in response to the number of days being less than or equal to a preset threshold, receiving from the carrier a reverse tracking number confirming the cancel shipment of the package to the customer;
      determining whether the unique identifier includes the reverse tracking number; and
      in response to determining that the reverse tracking number is included in the unique identifier, sending a notification to the seller including the reverse tracking number associated with the cancel shipment of the package to the customer and the waybill number of the package.

2. The system of claim 1, wherein the unique identifier includes feed information from the tracking number.

3. The system of claim 1, wherein the unique identifier includes a schedule information from the tracking number associated with the package for the cancellation of the order number.

4. The system of claim 1, wherein the unique identifier includes a contact information from the tracking number associated with the package for the cancellation of the order number.

5. The system of claim 1, wherein the at least one processor is further configured to perform steps comprising:
   sending the notification to the carrier delivering the package for the cancellation of the order number to cancel shipment of the package to the customer;
   wherein the notification includes a pre-recorded phone call.

6. The system of claim 1, wherein the at least one processor is further configured to perform steps comprising:
   sending the notification to the carrier delivering the package for the cancellation of the order number to cancel shipment of the package to the customer;
   wherein the notification includes a voicemail.

7. The system of claim 1, wherein the at least one processor is further configured to perform steps comprising:
   sending the notification to the carrier delivering the package for the cancellation of the order number to cancel shipment of the package to the customer;
   wherein the notification includes an email.

8. The system of claim 1, wherein the at least one processor is further configured to perform steps comprising:
   sending the notification to the carrier delivering the package for the cancellation of the order number to cancel shipment of the package to the customer;
   wherein the notification includes a posted message.

9. The system of claim 1, wherein the at least one processor is further configured to perform steps comprising:
   sending the notification to the carrier delivering the package for the cancellation of the order number to cancel shipment of the package to the customer;
   wherein the notification includes a short message service.

10. The system of claim 1, wherein the at least one processor is further configured to perform steps comprising:
    sending a return label to the customer for the package for the cancellation of the order number.

11. A computer-implemented method for an automatic and intelligent parcel retrieval, the method comprising:
    receiving an order number for an item purchased by the customer;
    receiving from a seller a waybill number associated with the order num for the item purchased by the customer and a carrier delivering a package for the item purchased by the customer;
    generating a unique identifier including the order number for the item purchased by the customer and the waybill number from the seller;
    detecting a cancellation of the order number associated with the item purchased by the customer;
    determining a tracking number in the unique identifier, associated with the waybill number from the seller and the carrier delivering the package, based on the cancellation of the order number;
    aggregating information in the unique identifier associated with the tracking number from the seller;
    parsing the aggregated information in the unique identifier for storing in the database;
    sending a notification to the carrier delivering the package to cancel shipment of the package to the customer based on the unique identifier associated with the cancellation of the order number;
    determining a number of days associated with the order number;
    in response to the number of days being less than or equal to a preset threshold, receiving from the carrier a reverse tracking number confirming the cancel shipment of the package to the customer;
    determining whether the unique identifier includes the reverse tracking number; and
    in response to determining that the reverse tracking number is included in the unique identifier, sending a notification to the seller including the reverse tracking number associated with the cancel shipment of the package to the customer and the waybill number of the package.

12. The method of claim 11, wherein the unique identifier includes feed information from the tracking number.

13. The method of claim 11, wherein the unique identifier includes a schedule information from the tracking number associated with the package for the cancellation of the order number.

14. The method of claim 11, wherein the unique identifier includes a contact information from the tracking number associated with the package for the cancellation of the order number.

15. The method of claim 11, further the method comprising:
- sending the notification to the carrier delivering the package for the cancellation of the order number to cancel shipment of the package to the customer;
- wherein the notification includes a pre-recorded phone call.

16. The method of claim 11, further the method comprising:
- sending the notification to the carrier delivering the package for the cancellation of the order number to cancel shipment of the package to the customer;
- wherein the notification includes a voicemail.

17. The method of claim 11, further the method comprising:
- sending the notification to the carrier delivering the package for the cancellation of the order number to cancel shipment of the package to the customer;
- wherein the notification includes an email.

18. The method of claim 11, further the method comprising:
- sending the notification to the carrier delivering the package for the cancellation of the order number to cancel shipment of the package to the customer;
- wherein the notification includes a posted message.

19. The method of claim 11, further the method comprising:
- sending the notification to the carrier delivering the package for the cancellation of the order number to cancel shipment of the package to the customer;
- wherein the notification includes a short message service.

\* \* \* \* \*

UNITED STATES PATENT AND TRADEMARK OFFICE
CERTIFICATE OF CORRECTION

PATENT NO. : 11,449,825 B2
APPLICATION NO. : 17/152925
DATED : September 20, 2022
INVENTOR(S) : Remesh Vijayan Page 1 of 2

It is certified that error appears in the above-identified patent and that said Letters Patent is hereby corrected as shown below:

On the Title Page

Item (57), in the Abstract, Line 1, "A computer-implemented systems and methods" should read --Computer-implemented systems and methods--.

Item (57), in the Abstract, Line 8, "the way bill" should read --the waybill--.

Item (57), in the Abstract, Line 14, "confirming the cancel shipment of the package," should read --confirming the shipment cancellation of the package,--.

In the Claims

In Claim 1, Column 29, Lines 41-42, "confirming the cancel shipment of the package" should read --confirming the shipment cancellation of the package--.

In Claim 1, Column 29, Lines 48-49, "associated with the cancel shipment of the package" should read --associated with the shipment cancellation of the package--.

In Claim 11, Column 30, Line 34, "the order num" should read --the order number--.

In Claim 11, Column 30, Lines 58-59, "confirming the cancel shipment of the package" should read --confirming the shipment cancellation of the package--.

In Claim 11, Column 30, Lines 65-66, "associated with the cancel shipment of the package" should read --associated with the shipment cancellation of the package--.

In Claim 15, Column 31, Lines 11-12, "further the method comprising:" should read --the method further comprising:--.

Signed and Sealed this
Twenty-second Day of November, 2022

Katherine Kelly Vidal
*Director of the United States Patent and Trademark Office*

CERTIFICATE OF CORRECTION (continued)
U.S. Pat. No. 11,449,825 B2

In Claim 16, Column 31, Lines 18-19, "further the method comprising:" should read --the method further comprising:--.

In Claim 17, Column 32, Lines 1-2, "further the method comprising:" should read --the method further comprising:--.

In Claim 18, Column 32, Lines 8-9, "further the method comprising:" should read --the method further comprising:--.

In Claim 19, Column 32, Lines 16-17, "further the method comprising:" should read --the method further comprising:--.